APPARATUS AND METHOD FOR INDICATING THE POSITION AND MOTION OF PHENOMENA IN SPACE
Filed Sept. 1, 1951
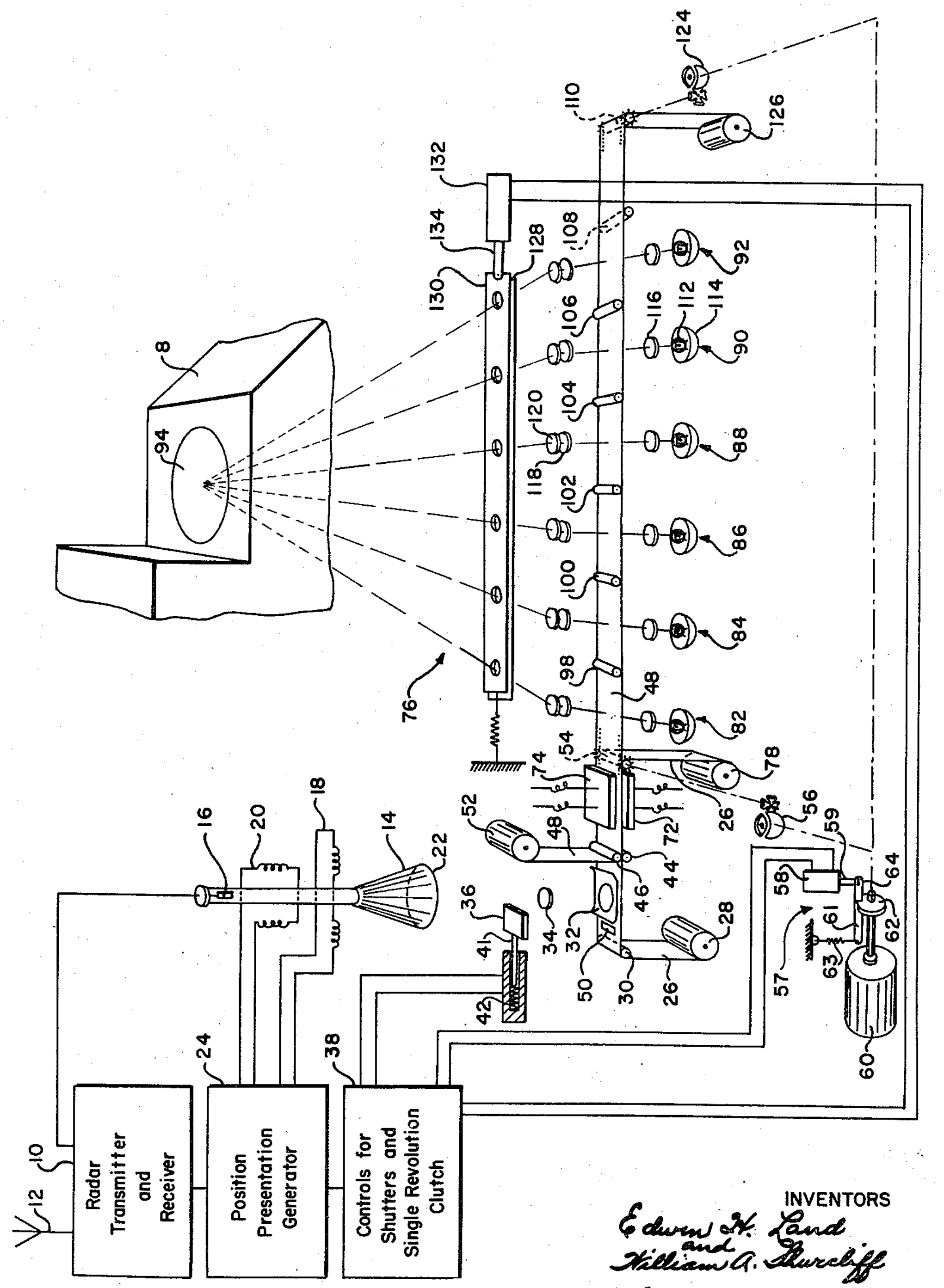
INVENTORS
Edwin H. Land
and
William A. Shurcliff
BY Brown and Mikulka
ATTORNEYS 2,779,017

APPARATUS AND METHOD FOR INDICATING THE POSITION AND MOTION OF PHENOMENA IN SPACE

Edwin H. Land and William A. Shurcliff, Cambridge, Mass., assignors to Polaroid Corporation, Cambridge, Mass., a corporation of Delaware Application September 1, 1951, Serial No. 244,822

22 Claims. (Cl. 343—7.7)

This invention relates to detection and more particularly to apparatus and method for indicating the position and motion of phenomena in space.

An object of the present invention is to provide a means for indicating the position and motion of objects in space and for enabling an observer to clearly distinguish indications of moving objects from indications of stationary objects.

Another object of the present invention is to provide a means of the above type which indicates the speed and direction of motion of objects in space.

Further objects of the present invention are to provide a method and means for integrating the information obtained in successive observations of an indicating device whose field of view includes moving and stationary phenomena, said method and means being effective to produce in a single picture a composite record of said successive observations, in which record the stationary phenomena are differently represented than the moving phenomena and the latter are so shown that their relative speeds and directions of movement can be readily estimated.

Other objects of the present invention are to provide a method and a means for analyzing a field of view containing moving phenomena and stationary phenomena, said method and means comprising the steps of producing successive photographs of said field of view in which photographs said phenomena appear relatively bright against a relatively dark background, projecting an image of at least one of said photographs in light of one character onto a viewing means, projecting an image of at least another of said photographs in light of another character onto said viewing means, and registering said images on said viewing means, whereby characteristic indications of moving objects and characteristic indications of stationary objects are produced, said characteristic indications of moving objects being different than are said characteristic indications of stationary objects.

Still a further object of the present invention is to provide a device for indicating the position and motion of objects in space, said device comprising a cathode ray tube screen, radar means for producing on said screen successive indications of the positions of objects in space, means for producing successive positive photographs of said successive indications, a viewing means, means for projecting an image of at least one of said photographs in light of one color onto said viewing means, means for projecting an image of at least one of said photographs in light of another color onto said viewing means, and means for registering said images on said viewing means, whereby characteristic indications of moving objects and characteristic indications of stationary objects are produced, said characteristic indications of moving objects being different from said characteristic indications of stationary objects.

Other objects of the invention will in part be obvious and will in part appear hereinafter.

The invention accordingly comprises the apparatus possessing the construction, combination of elements and arrangement of parts and the process involving the several steps and the relation and the order of one or more of such steps with respect to each of the others which are exemplified in the following detailed disclosure, and the scope of the application of which will be indicated in the claims.

For a fuller understanding of the nature and objects of the invention, reference should be had to the following detailed description taken in connection with the accompanying drawing which represents schematically one form of detecting device embodying the present invention.

The herein disclosed embodiment of the present invention in the form illustrated comprises as components a cathode ray tube screen, a radar means for producing visible indications upon the cathode ray tube screen of the position of objects in space in relation to said radar means, a photographic means for producing positive prints of successive indications of said cathode ray tube screen, and means for projecting a plurality of said prints in superposed registered relation, some of said plurality of prints being projected in one color and others in another color, the two colors producing, when added, a third distinctive color. For example, certain of the prints may be projected in red and others in green, whereupon moving objects appear in the composite picture as red and green spots of light and stationary objects appear in yellow.

In practice, each of the aforementioned positive prints portrays one entire scanning cycle of the cathode ray impinging on the cathode ray tube screen. Consider, now, a first positive image which represents the cathode ray tube screen throughout one scanning cycle and a second positive image which represents the cathode ray tube screen throughout a later scanning cycle. It is apparent that the spot of light which represents a stationary object in the first image corresponds in relative position to the spot of light which represents that stationary object in the second image. When the first image is projected onto the viewing screen in red light, the second image may be projected onto the viewing screen in green light and registered with the first image. Under such circumstances, a green spot of light which represents the stationary object in the second image is superposed on the red spot of light which represents the stationary object in the first image and the stationary object is represented on the viewing screen as a single yellow spot of light. On the other hand, the spot of light which represents a moving object in the first image does not correspond in relative position to the spot of light which represents the moving object in the second image. When the first image is projected on the viewing screen in red light and the second image is projected on the viewing screen in green light and registered with the first image, the green spot of light which represents the moving object in the first image will not be superposed on the red spot of light which represents the moving object in the second image. It thus becomes possible to obtain a composite image which shows a moving object in terms of red and green spots of light, stationary objects in yellow and the background in black.

It is to be expressly understood that in connection with a cathode ray tube screen, positive, rather than negative, prints are greatly preferred in the practice of the present invention. Consider, for example, the illustrated embodiment wherein the images of six positive prints of six successive scanning cycles are registered on a viewing screen, three of said prints being projected in red and three in green. A moving object, for a given scanning cycle, will be represented on the viewing screen as a green or red spot of light which is created by a beam of light passing through a given portion of one of the aforementioned positive prints. Portions of the remaining five prints that correspond in relative position to said given portions are opaque. If negative prints were to be employed, however, a given portion which represents a moving object in one of the aforementioned negative prints could be opaque. An indication on the viewing screen of a moving object for a given scanning cycle would be created by beams of light passing through portions of the remaining five negative prints which correspond in relative position to said given portion. Therefore, it is apparent that if negative prints were to be employed, indications on the viewing screen of a moving object would be practically indistinguishable from the background.

In the case of a cathode ray tube screen the moving and stationary phenomena in the field of view, namely, the spots of light on the cathode ray tube screen, are bright against a background of darkness. To generalize, it may be stated that when it is desired to analyze a field of view in which the phenomena to be examined are bright against a dark background, positive photographs are greatly prefered. Similarly, it may be stated that when it is desired to analyze a field of view in which the phenomena to be examined are dark against a bright background, negative photographs are greatly preferred.

For the purpose of clarity, the present disclosure omits a description and detailed drawings of structure which are known to persons skilled in the art and a review of which is not needed for an understanding of the present invention.

Referring now to the drawing, there is illustrated a device embodying a preferred form of the present invention. Numeral 8 designates a suitable housing which may enclose most of the components of the preferred embodiment. Forming a part of the prefered embodiment is a search means which may be of conventional design and which may comprise conventional radar transmitter and receiver structure 10, an appropriate rotatable antenna system 12, and a means for producing indications of the successive positions of detected objects in space. An indicating means for producing indications of the successive positions of objects in space that have been detected by the search means is provided. Said indicating means, in the form thereof as shown, comprises a plan position-indicating cathode ray tube 14 of conventional design which is provided with a suitable cathode ray generating means 16 and the ray deflecting means 18 and 20 which operate to deflect the cathode ray in vertical and horizontal directions, respectively. A cathode ray emanating from the cathode ray generating means is adapted to impinge on a moderately persistent cathode ray tube screen 22 to form a spot of light on said screen 22 when an object in space has been detected by the search means 10. In response to a suitable position presentation generator 24 and ray deflecting means 18 and 20, a cathode ray emanating from cathode ray generating means 16 is adapted to scan from the center of the screen 22 outwardly and then back to said center, each radial line so scanned being at an angle to a previous radial line so scanned. Antenna 12 is coupled, as by means of a selsyn or by means of a gear and potentiometer, to position presentation generator 24 so that the antenna and the radial scanning line on the screen 22 rotate in unison. A signal transmitted at a given time from antenna 12 is synchronized by seach means 10 with a scan of the cathode ray outwardly from the center of screen 22 and a signal reflected from an object in space is impressed by search means 10 at a given time thereafter on cathode ray tube screen 22 as a spot of light. The polar coordinates of a spot of light so formed on cathode ray tube screen 22 with respect to the center of said screen are functionally related to the position of said object in space with respect to the detecting device.

The device of the present invention is provided with a means for producing a record of the successive indications presented by cathode ray tube screen 22. Preferably, this means comprises photographic apparatus capable of exposing a photosensitive film to form in the frames thereof a succession of latent images. In order to produce successive latent images of the cathode ray tube screen 22, the illustrated embodiment is provided with a mechanism which is broadly similar to a motion picture camera and which successively positions the frames of a photosensitive film 26 for exposure. Preferably, film 26 comprises a photosensitive silver halide emulsion coated on a paper base and extends from a film roll 28 past a suitable guide means, such as roller 30, and into a film gate 32. A lens 34 is provided to focus light emanating from cathode ray tube screen 22 onto a frame of film 26 that is positioned in film gate 32. A suitable shutter means is provided for alternately passing and blocking radiation emanating from cathode ray tube screen 22. As shown, said shutter means comprises a shutter blade 36 which is synchronized with the intermittent movement of film 26 so that light emanating from cathode ray tube screen 22 may strike a frame of film 26 that is positioned in film gate 32 only when said film 26 is at rest. Means are provided to synchronize the exposure of successive frames of film 26 with successive scans of cathode ray tube 14. Although shutter blade 36 is closed for a short period during a complete scanning cycle, by virtue of the persistence of screen 22, the indications photographically recorded on each frame of film 26 are for an entire scanning cycle. In the form thereof as shown, said synchronizing means comprises a suitable control circuit 38, which is responsive to position presentation generator 24, and a solenoid 40 for opening and closing shutter blade 36. The terminals of solenoid 40 are operatively connected to control circuit 38 and the core 41 thereof is suitably connected to shutter blade 36. Solenoid 40 thus is synchronized with position presentation generator 24 and is energized to open shutter blade 36 when a frame of film 26 is properly positioned for exposure in film gate 32. Such means as spring 42 is provided to close shutter blade 36 when solenoid 40 is deenergized during movement of first film 26.

Although in the illustrated embodiment exposure of successive frames of film 26 is synchronized with successive scans of cathode ray tube 14, it is apparent that not all scans need be photographed on separate frames and that images of a plurality of scans may be impressed on a single frame. Alternatively, in order to accentuate the distance between spots of light representing a moving object in the composite picture of a plurality of scans, it may be desirable to omit photographic recording of certain of the scans.

The photographic record embodied in the aforementioned latent images may not need to be analyzed immediately and therefore may be developed by a conventional process. Frequently, however, as when an immediate indication of the presence of moving objects is desired, rapid processing means are necessary. Since the indications on a cathode ray tube screen are bright against a dark background, it is desirable that the aforementioned latent images be processed to developed positive images. It is to be expressly understood that many forms of rapid processing photographic structure may be used in connection with the present invention. However, rapid processing means of the type disclosed in Patent No. 2,543,181, issued to Edwin H. Land on February 27, 1951 for Photographic Product Comprising a Rupturable Container Carrying a Photographic Processing Liquid, may be used to great advantage. The aforementioned rapid processing means accomplishes the developement of latent images in the frames of a first photosensitive film by superposing said frames on a second film and by spreading a processing composition between said frames and said second film. The second film in the present embodiment preferably is transparent. The first film may carry a plurality of processing composition containers from which the aforementioned processing composition may be supplied. The processing composition may comprise a developer, a silver halide solvent, an alkali and a viscosity-increasing, film-forming material such as an alkali-inert polymer. Said first and second films, preferably may be brought into contact and passed between a pair of pressure-applying members. Passage of said first and second films between said pressure-applying members causes superposition of said first and second films and the spreading of a uniformly thin layer of processing composition therebetween. The result of this procedure is to develop a latent image in a frame of the first photosensitive film to silver and to form in said frame a soluble silver complex from unexposed silver halide for transfer to the second film. This complex, at least in part, may be transferred by imbibition to the second film where it may be developed to silver to provide a developed positive photograph or representation.

In the present embodiment, first film 26 extends from film gate 32 to the region between pressure-applying members 44 and 46. A second transparent film 48 extends from a suitably mounted roll 52 to the region between said pressure-applying members 44, 46. Preferably, a plurality of processing composition containers 50 are secured to first film 26. Said first and second films thus may be moved into superposed relation between pressure-applying members 44, 46. When a container 50 passes between pressure-applying members 44, 46, the pressure created within the processing composition held thereby causes the rupture of said container and the release of said processing composition. As the movement of first and second films 26, 48 between pressure-applying members 44, 46 continues, the processing composition discharged from the ruptured container is spread between said first and second films in a uniformly thin layer to form in a frame of the second film a positive photograph or representation which corresponds to the latent image of the cathode ray tube screen 22 that originally had been formed in a frame of first film 26.

The pressure-applying members 44, 46 are shown in the drawing as a pair of rollers which may be urged toward each other by suitable spring loading (not shown). An example of such spring loading appears in Patent No. 2,538,511 for Photographic Apparatus, issued on January 16, 1951 to Murry N. Fairbank. Although the aforementioned pressure-applying members in the present embodiment comprise rollers, it is to be understood that other pressure-applying means may be advantageously used. For example, the pressure-applying members 44, 46 may comprise a pair of suitably shaped plates or a plate and a roller. Furthermore, processing composition containers need not be attached to second film 48 but may be fed between said first and second films by such means as is disclosed in Patent No. 2,435,718 for Photographic Process and Apparatus for Subjecting a Photographic Film to a Processing Fuid, issued to Edwin H. Land on February 10, 1948. Alternatively, processing composition may be continuously provided by such means as is disclosed in Patent No. 2,520,641 for Photographic Apparatus, issued to Edwin H. Land on August 29, 1950.

The illustrated embodiment is provided with a suitable intermittent drive mechanism by means of which successive frames of first film 26 are positioned in film gate 32 and by means of which first and second films 26, 48 may be drawn between pressure-applying members 44, 46. As shown, a drive sprocket 54, by meshing with apertures at the edges of both the first and second films 26, 48, is adapted to draw said films between pressure-applying members 44, 46. Drive sprocket 54 further serves to register the second film with the first film so that positive photographs or representations formed on second film 48 are located in relative positions that are identical to the relative positions of the latent images on first film 26 from which said positive photographs were formed. In the illustrated embodiment, a Geneva movement insures precisely controlled intermittent rotation of drive sprocket 54. Geneva movement 56 in turn is driven through a single revolution clutch 57 by a motor 60. A solenoid 58 having a slidable core 59 controls the operation of clutch 57 in the following manner. Forming a part of clutch 57 is a disk means 62 of conventional design, the periphery of which is provided with a notch. A stop lever 64 is adapted to ride on said periphery. Stop lever 64 may be pivoted as at 61 and a suitable spring 63 may urge a portion of stop lever 64 against the periphery of disk means 62 in the conventional manner. When stop lever 64 is engaged in the aforementioned notch, the output shaft of clutch 57 is at rest notwithstanding the rotation of the shaft of motor 60. When stop lever 64 is disengaged from this notch the output shaft of clutch 57 is driven by motor 60. Slidable core 59 of solenoid 58 is operatively connected to stop lever 64 as by means of a pin and slot. The terminals of solenoid 58 are operatively connected to control circuit 38 in order to synchronize actuation of clutch 57 with the closing of shutter blade 36. Control circuit 38 is so constituted as to momentarily energize solenoid 58 when shutter blade 36 has closed. In this manner stop lever 64 is disengaged from the notch of disk means 62 to permit rotation of said disk and is engaged in said notch after the completion of a single revolution of said disk means.

From the time a portion of first film 26 comes into contact with a portion of second film 48 between pressure-applying members 44, 46 to the time at which said portions are separated at drive sprocket 54, a latent image in a frame of first film 26 is processed and a positive photograph or representation is formed in a frame of second film 48. In order to provide uniformly rapid processing of the latent images on first film 26, means, such as heating elements 72 and 74, may be provided adjacent the superposed portions of said first and second films 26, 48. After the development of a positive photograph or representation in a frame of second film 48 from the latent image in a frame of first film 26, said frame of second film 48 moves into a display means, designated generally by 76, and the frame of first film 26 moves toward take-up roll 78.

In accordance with the present invention, display means 76 of the illustrated embodiment includes a viewing means, means for projecting images of a plurality of the aforementioned positive photographs in light of one color onto said viewing means and for projecting images of a plurality of the remainder of said photographs in light of another color onto said viewing means, and means for registering said images on said viewing means. As shown, the display means 76 comprises a plurality of projectors 82, 84, 86, 88, 90 and 92 which are adapted to project images of a plurality of the photographs or representations of the cathode ray tube screen 22 that have been formed in frames of second film 48 and which are adapted to register or superpose said images on a viewing screen. As shown, the viewing screen comprises a frosted glass screen 94. Suitable guide means, such as rollers 98, 100, 102, 104, 106 and 108 are provided to position successive frames of second film 48 for projection in successive projectors. Second film 48 preferably extends from drive sprocket 54, under guide rollers 98, 100, 102, 104 and 106 and over guide roller 108 to second drive sprocket 110. Each of projectors 82, 84, 86, 88, 90 and 92 may comprise a source of illumination 112, a reflector 114, a condensing lens system 116, an objective lens 118, and a colored filter 120. Projectors 82, 84 and 86 may be provided with green colored filters 120 and projectors 88, 90 and 92 may be provided with red colored filters 120. When six successive frames of second film 48 are properly positioned in display means 76 for projection, a stationary object, successively represented on cathode ray tube screen 22 at similar positions, appears on viewing screen 94 as a yellow spot of light and a moving object, successively represented on cathode ray tube screen 22 at dissimilar positions, appears on viewing screen 94 as a succession of spots of light, the forward three of which are green and the rearward three of which are red. It is apparent that the distance between spots is a measure of the speed of travel of the moving object. Also, variations of the distance between successive spots is indicative of acceleration or deceleration of the moving object. Furthermore, the straight or curved line along which said spots of light lie indicates the direction and change of direction of travel of the moving object.

Although display means 76 comprises six projectors, it is expressly to be understood that any plural number of projectors may be advantageously used. It is also to be understood that the filters which enable projection of different frames of second film 48 in light of different colors are not limited to the colors red and green. For example, one filter may absorb a larger percentage of white light than does another so that a moving object may appear on a suitable viewing screen as alternate white and black dots against a background of gray. Also, three or more colors could be advantageously used. When the primaries red, green and blue are employed, stationary objects appear as white spots and moving objects appear as a succession of red, green and blue dots. The relative positions of a plurality of filters may be arranged as desired. For example, in the illustrated embodiment, filters 120 may be alternately red and green so that a moving object may appear on viewing screen 94 as a succession of alternate red and green spots of light.

Second film 48 may be intermittently drawn through display means 76 by such means as aforementioned second drive sprocket 110. The second drive sprocket 110 may be intermittently driven as by a Geneva movement 124 which in turn is driven through single revolution clutch 57 by motor 60 in the same manner as is first drive sprocket 54. From drive sprocket 110, second film 48 extends to take-up roll 126.

In the present embodiment, shutter means are provided which are synchronized with drive sprockets 54, 110 to prevent light from being projected onto screen 94 during movement of second film 48. As shown, the shutter mean comprises a stationary strip of sheet metal 128 having six apertures therein. Riding in suitable tracks (not shown) is reciprocable strip of sheet metal 130, said reciprocable strip having apertures therein which may be aligned with the apertures of stationary strip 128 and having solid portions which prevent light from sources of illumination 112 from being projected onto screen 94 during motion of second film 48. The apertures of reciprocable strip 130 ordinarily are held in alignment with the apertures in stationary strip 128 by means of solenoid 132, the terminals of which are connected to control circuit 38 and the core 134 of which is connected to reciprocable strip 130. When second film 48 is in motion, solenoid 132 is deenergized and reciprocable strip 130 is drawn, by such means as spring 138, to a position at which the apertures therein are not aligned with the apertures in stationary strip 128. Thus, light from projectors 82, 84, 86, 88, 90 and 92 is prevented from reaching screen 94 during motion of second film 48.

In operation of the herein disclosed detecting device, frames of first photosensitive film 26 are exposed to successive scans of cathode ray tube screen 22 to form latent images of the indications of successive positions of objects in space that have been detected by radar means 10. Film 26, as stated above, supports a plurality of processing composition containers 50. Second film 48 is brought substantially into contact with the latent image-carrying surface of first film 26 and the two superposed films are drawn by intermittent sprocket 54 between pressure-applying members 44, 46 to cause the release and spreading of the processing composition between said first and second films. From the time the first and second films are brought substantially into contact between pressure-applying members 44, 46 to the time at which said first and second films are separated at drive sprocket 54, a latent image in a frame of first film 26 is developed in a frame of second film 48 into a positive photograph or representation of cathode ray tube screen 22. In display means 76, second film 48 is intermittently driven by drive sprocket 110 past guide rollers 98, 100, 102, 104, 106 and 108. When second film 48 is at rest in display means 76, projectors 82, 84, 86, 88, 90 and 92 are adapted to project images of six successive representations, formed in frames of second film 48, through green and red filters 120 and onto viewing screen 94. As stated above, this arrangement is such that moving objects appear on the viewing screen as red and green spots of light, stationary objects appear in yellow and the background appears black.

Numerous modifications of the device shown in the drawing exist. In one such modification, records of the successive scans of a search means are provided by a plurality of storage tubes. Each storage tube is adapted to retain a record of a complete scan for a predetermined time, after which the record of a new scan may be impressed thereon. Images of these records may be projected onto a viewing screen in the manner herein disclosed in order to produce a composite picture of the aforementioned type in which moving objects may be readily distinguished from stationary objects.

It is to be pointed out that although display means of the type herein disclosed may be used to great advantage in conjunction with a search means, the use of such display means is not limited to the analysis of the indications of the successive positions of objects in space provided by a cathode ray tube screen. Such display means may be advantageously used in other situations where there is present a field of view containing a profusion of phenomena and where it is desired to ascertain at a glance which, if any, of these phenomena have changed in position. By way of example, a first aerial photograph of a given area may be taken on one day and a second aerial photograph of the given area may be taken on a succeeding day. If these first and second photographs are projected in different colors onto a viewing screen and registered with each other, an immediate indication of objects that have moved may be obtained.

A novel method forms a part of the herein disclosed invention. Generally, this method is for distinguishing moving phenomena from stationary phenomena in a field of view and comprises the steps of forming successive latent images of a field of view, processing said latent images to successive photographs of said field of view, in which photographs said phenomena appear bright against a dark background, rendering visible the image of one of said photographs in one type of light and superposing in registered relation on said image the image of another of said photographs in a distinctively different type of light.

The steps of taking successive photographs of the field of view and of processing the resulting latent images to successive photographs or representations may be carried out in any known manner. Positive photographs are produced when the phenomena are bright against a dark background and negative photographs are produced when the phenomena are dark against a bright background. The steps of projecting an image of at least one of said successive photographs in light of one color or character onto a viewing means and of projecting an image of at least another of said successive photographs in light of a different color or character onto such viewing means and in registration with said first-mentioned image, by way of example, may be carried out in a stereoscopic projector. Thus, an image of one of said successive photographs may be projected onto a viewing screen in light of one color, such as red, through one of the lenses of a stereoscopic projector, and an image of one of the remainder of said successive photographs may be projected onto a viewing screen in light of another color, such as green, through the other of the lenses of said stereoscopic projector. As a result of the above steps, phenomena in the field of view which have changed in position appear on the viewing screen as red and green spots of light and stationary objects appear in yellow. Alternatively, instead of a viewing screen, such photographs may be observed through a pair of conventional stereoscopic eyepieces, one of which has been provided with a filter of one color and the other of which has been provided with a filter of another color.

Since certain changes may be made in the above apparatus and process without departing from the scope of the invention herein involved, it is intended that all matter contained in the above description or shown in the accompanying drawing shall be interpreted as illustrative and not in a limiting sense.

What is claimed is:

1. Apparatus for analyzing a field of view containing moving phenomena and stationary phenomena, said apparatus comprising means for producing a plurality of successive records of said field of view, each of said records containing bright indications of said moving phenomena and said stationary phenomena on a dark background, means for rendering visible the image of at least one of said records in one type of light, means for rendering visible the image of at least one other of said records in a distinctively different type of light, each of said images containing bright indications of said moving phenomena and said stationary phenomena on a dark background, and means for superposing said images in registered relation in order to produce a composite picture containing characteristic indications of said moving phenomena and characteristic indications of said stationary phenomena, said characteristic indications of moving phenomena being different from said characteristic indications of stationary phenomena.

2. Apparatus for analyzing a field of view containing moving phenomena and stationary phenomena, in which field of view said phenomena appear relatively bright against a relatively dark background, said device comprising means for producing successive records of said field of view, each of said records being positive means for rendering visible the image of at least one of said records in one type of light, means for rendering visible the image of at least one other of said records in a distinctively different type of light, each of said images containing indications of said moving phenomena and said stationary phenomena, and means for superposing said images in registered relation in order to produce a composite picture containing characteristic indications of said moving phenomena and characteristic indications of said stationary phenomena, said characteristic indications of moving phenomena being different from said characteristic indications of stationary phenomena.

3. Apparatus for analyzing a field of view containing moving phenomena and stationary phenomena, in which field of view said phenomena appear relatively dark against a relatively bright background, said device comprising means for producing successive records of said field of view, each of said records being negative means for rendering visible the image of at least one of said records in one type of light, means for rendering visible the image of at least one other of said records in a distinctively different type of light, each of said images containing indications of said moving phenomena and said stationary phenomena, and means for superposing said images in registered relation in order to produce a composite picture containing characteristic indications of said moving phenomena and characteristic indications of said stationary phenomena, said characteristic indications of moving phenomena being different from said charcteristic indications of stationary phenomena.

4. A device for analyzing a field of view containing moving phenomena and stationary phenomena, in which field of view said phenomena appear relatively bright against a relatively dark background, said device comprising means for producing successive photographs of said field of view, each of said photographs being positive, means for projecting an image of at least one of said photographs in light of one color onto a viewing means, means for projecting an image of at least another one of said photographs in light of another color onto said viewing means, each of said images containing indications of said moving phenomena and said stationary phenomena, and means for registering said images on said viewing means, whereby characteristic indications of moving objects and characteristic indications of stationary objects are produced, said characteristic indications of moving objects being different from said characteristic indications of said stationary objects.

5. A device for analyzing a field of view containing moving phenomena and stationary phenomena, in which field of view said phenomena appear relatively bright against a relatively dark background, said device comprising means for producing successive photographs of said field of view, each of said photographs being negative means for projecting an image of at least one of said photographs in light of one color onto a viewing means, means for projecting an image of at least another of said photographs in light of another color onto said viewing means, each of said images containing indications of said moving phenomena and said stationary phenomena, and means for registering said images on said viewing means whereby chracteristic indications of moving objects and characteristic indications of stationary objects are produced, said characteristic indications of moving objects being different from said characteristic indications of stationary objects.

6. A method of analyzing the field of view containing moving phenomena and stationary phenomena, said method comprising the steps of producing successive records of said field of view, each of said records containing bright indications of said moving phenomena and said stationary phenomena on a dark background, projecting an image of at least one of said records in one type of light onto a viewing means, projecting an image of at least another of said records in another distinctively different type of light onto said viewing means, each of said images containing indications of said moving phenomena and said stationary phenomena, and registering said images on said viewing means, whereby characteristic indications of moving objects and characteristic indications of stationary objects are produced, said characteristic indications of moving objects being different from said characteristic indications of stationary objects.

7. A method of analyzing a field of view containing moving phenomena and stationary phenomena, in which field of view said phenomena appear relatively bright against a relatively dark background, said method comprising the steps of producing successive photographs of said field of view, each of said photographs being positive, projecting an image of at least one of said photographs in one type of light onto a viewing means, projecting an image of at least another of said photographs in another distinctively different type of light onto said viewing means, each of said images including indications of said moving phenomena and said stationary phenomena, and registering said images on said viewing means, whereby characteristic indications of moving objects and characteristic indications of stationary objects are produced, said characteristic indications of moving objects being different from said characteristic indications of stationary objects.

8. A method of analyzing a field of view containing moving phenomena and stationary phenomena, in which field of view said phenomena appear relatively dark against a relatively bright background, said method comprising the steps of producing successive photographs of said field of view, each of said photographs being negative, projecting an image of at least one of said photographs in one type of light onto a viewing means, projecting an image of at least another of said photographs in another distinctively different type of light onto said viewing means, each of said images containing indications of said moving phenomena and said stationary phenomena, and registering said images on said viewing means, whereby characteristic indications of moving objects and characteristic indications of stationary objects are produced, said characteristic indications of moving objects being different from said characteristic indications of stationary objects.

9. A device for indicating the position and motion of moving objects and stationary objects in space, said device comprising means for producing successive representations of the positions of said moving objects and said stationary objects in space, means for producing successive photographs in which said representations of said moving objects and said stationary objects appear bright against a dark background, means for rendering visible the image of one of said photographs in one type of light, means for rendering visible the image of another of said photographs in a distinctively different type of light, said representations of said moving objects and said stationary objects appearing in each of said images, and means for superposing said images in registered relation in order to produce a composite picture containing characteristic indications of moving objects and characteristic indications of stationary objects, said characteristic indications of moving objects being different from said characteristic indications of stationary objects.

10. A device for indicating the position and motion of moving objects and stationary objects in space, said device comprising a cathode ray tube screen, search means for producing on said cathode ray tube screen indications of the succesive positions of said moving objects and said stationary objects in space, means for producing successive photographs of said cathode ray tube screen, each of said photographs being positive so as to contain bright indications of said moving objects and said stationary objects on a dark background, first filter means adapted to pass a first wavelength range of visible radiation, second filter means adapted to pass a second wavelength range of visible radiation, said second wavelength range being different from said first wavelength range, viewing means, means for projecting the image of at least one of said photographs through said first filter means and onto said viewing means, means for projecting the image of at least another of said photographs through said second filter means and onto said viewing means, each of said images containing indications of said moving objects and said stationary objects, and registration means for superposing said images on said viewing means to produce characteristic indications of said moving objects and characteristic indications of said stationary objects, said characteristic indications of moving objects being different from said characteristic indications of stationary objects.

11. A device for indicating the the position and motion of moving objects and stationary objects in space, said device comprising means for producing successive indications of the positions of said moving objects and said stationary objects in space, said indications being bright on a dark background means for producing successive photographs of said successive indications, each of said photographs being positive, first filter means for passing radiation primarily of a first wavelength band, second filter means for passing radiation primarily of a second wavelength band, a viewing screen, means for projecting the image of one of said successive photographs through said first filter means and onto said viewing screen, means for projecting the image of another of said successive photographs through said second filter means and onto said viewing screen, each of said images containing indications of said moving objects and said stationary objects and means for registering said images on said viewing screen in order to produce characteristic indications of the positions of moving objects and characteristic indications of the positions of stationary objects, said characteristic indications of moving objects being different from said characteristic indications of stationary objects.

12. A device for indicating the position and motion of objects in space, said device comprising a cathode ray tube screen, search means for producing on said cathode ray tube screen indications of the successive positions of objects in space, exposure means for producing on a photosensitive film a succession of negative latent images of said cathode ray tube screen, rapid processing means including a pair of pressure-applying members for superposing said photosensitive film and another film and for spreading a processing composition between said films in order to produce on said other film a succession of positive representations of said cathode ray tube screen, viewing means, optical means for projecting an image of one of said positive representations in light of one color onto said viewing means and for projecting an image of another of said positive representations in light of another color onto said viewing means, and means for registering said images on said viewing means in order to produce characteristic indications of the positions of moving objects and characteristic indications of the positions of stationary objects, said characteristic indications of moving objects being different from said characteristic indications of stationary objects.

13. The device of claim 12 wherein said one color is red and said other color is green.

14. A device for indicating the position and motion of objects in space, said device comprising a cathode ray tube screen, search means for producing on said cathode ray tube screen indications of the successive positions of objects in space, exposure means for producing on a photosensitive film a succession of negative latent images of said cathode ray tube screen, rapid processing means including a pair of pressure-applying members for superposing said photosensitive film and another film and for spreading a processing composition between said films in order to produce on said other film a succession of positive representations of said cathode ray tube screen, viewing means optical means for projecting images of a plurality of said positive representations in light of one color onto said viewing means and for projecting images of a plurality of the remainder of said positive representations in light of another color onto said viewing means, and means for registering said images on said viewing means in order to produce characteristic indications of the positions of moving objects and characteristic indications of the positions of stationary objects, said characteristic indications of moving objects being different from said characteristic indications of stationary objects.

15. A device for indicating the position and motion of moving objects and stationary objects in space, said device comprising search means for producing successive indications of the successive positions of said moving objects and said stationary objects in space, said indications being bright against a dark background, means for producing successive records of said indications, each of said records being positive, viewing means, means for projecting the image of at least one of said successive records onto said viewing means in one color, means for projecting the image of at least another of said successive records onto said viewing means in light of a distinctively different color, each of said images containing indications of said moving objects and said stationary objects and registration means for superposing said images on said viewing means to produce characteristic indications of the positions of moving objects and characteristic indications of the positions of stationary objects, said characteristic indications of moving objects being different from said characteristic indications of stationary objects.

16. A device for analyzing a field of view containing moving phenomena and stationary phenomena, in which field of view said phenomena appear relatively bright against a relatively dark background, said device comprising exposure means for producing on a photosensitive film a succession of latent images of said field of view, each of said latent images being negative and containing indications of said moving phenomena and said stationary phenomena, single-step processing means including a pair of pressure-applying members for superposing said photosensitive film on another film and for spreading a processing composition between said films in order to produce on said other film a succession of photographs of said field of view, each of said photographs being positive and containing indications of said moving phenomena and said stationary phenomena, viewing means, optical means for projecting an image of one of said photographs in light of one color onto said viewing means, said image of said one of said photographs containing indications of said moving phenomena and said stationary phenomena, optical means for projecting an image of another of said photographs in light of another color onto said viewing means, said image of said other of said photographs containing indications of said moving phenomena and said stationary phenomena, and means for registering said images on said viewing means in order to produce characteristic indications of the positions of moving objects and characteristic indications of the positions of stationary objects, said characteristic indications of moving objects being different from said characteristic indications of stationary objects.

17. A device for analyzing a field of view containing moving phenomena and stationary phenomena, in which field of view said phenomena appear relatively bright against a relatively dark background, said device comprising exposure means for producing on a photosensitive film a succession of latent images of said field of view, each of said latent images being negative and containing indications of said moving phenomena and said stationary phenomena, single-step processing means including a pair of pressure-applying members for superposing said photosensitive film on another film and for spreading a processing composition between said films in order to produce on said other film a succession of photographs of said field of view, each of said photographs being positive and containing indications of said moving phenomena and said stationary phenomena, viewing means, optical means for projecting an image of one of said photographs in light of one color onto said viewing means, said image of said one of said photographs containing indications of said moving phenomena and said stationary phenomena, optical means for projecting an image of another of said photographs in light of another color onto said viewing means, said image of said other of said photographs containing indications of said moving phenomena and said stationary phenomena, and means for registering said images on said viewing means in order to produce indications of the positions of moving objects in light of said one color and said other color and indications of the positions of stationary objects in light of an additive color which is the sum of said one and said other color.

18. Apparatus for analyzing a field of view containing moving phenomena and stationary phenomena, said apparatus comprising means for producing a plurality of successive records of said field of view, each of said records containing bright indications of said moving phenomena and said stationary phenomena on a dark background, means for rendering visible an image of at least one of said records in light of a first type, means for rendering visible an image of at least another of said records in light of a second type, said light of said first type and said light of said second type being distinctively different, the indications of said stationary phenomena in said one of said records being substantially identical in position to the indications of said stationary phenomena in said other of said records, the indications of said moving phenomena of said one of said records being substantially different in position from the indications of said moving phenomena in said other of said records, and means for superposing said images so that the indications of said stationary phenomena in the image of said one of said records are in registration with the indications of said stationary phenomena in the image of said other of said images in order to produce a composite picture containing characteristic indications of said moving phenomena and characteristic indications of said stationary phenomena, said characteristic indications of said moving phenomena being different from said characteristic indications of said stationary phenomena.

19. A device for indicating the position and motion of moving objects and stationary objects in space, said device comprising a cathode ray tube screen, search means for producing on said cathode ray tube screen indications of the successive positions of said moving objects and said stationary objects in space, said indications appearing relatively bright against a relatively dark background, said device comprising means for producing successive positive photographs of said field of view, means for rendering visible the image of at least one of said photographs in light of a first type, means for rendering visible an image of at least another of said photographs in light of a second type, the indications of said stationary phenomena in said one of said photographs being substantially identical in position to the indications of said stationary phenomena in said other of said photographs, the indications of said moving phenomena of said one of said photographs being substantially different in position from the indications of said moving phenomena in said other of said photographs, said light of said first type and said light of said second type being distinctively different, and means for superposing said images so that the indications of said stationary phenomena in the image of said one of said photographs are in registration with the indications of said stationary phenomena in the image of said other of said photographs in order to produce a composite picture containing characteristic indications of said moving phenomena and characteristic indications of said stationary phenomena, said characteristic indications of said moving phenomena being different from said characteristic indications of said stationary phenomena.

20. A device for indicating the position and motion of moving objects and stationary objects in space, said device comprising a cathode ray tube screen, search means for producing on said cathode ray tube screen indications of the successive positions of said moving objects and said stationary objects in space, said indications appearing relatively bright against a relatively dark background, said device comprising means for producing successive positive photographs of said field of view, means for rendering visible the image of at least one of said photographs in light of a first color, means for rendering visible an image of at least another of said photographs in light of a second color, the indications of said stationary phenomena in said one of said photographs being substantially identical in position to the indications of said stationary phenomena in said other of said photographs, the indications of said moving phenomena of said one of said photographs being substantially different in position from the indications of said moving phenomena in said other of said photographs, and means for superposing said images so that the indications of said stationary phenomena in the image of said one of said photographs are in registration with the indications of said stationary phenomena in the image of said other of said photographs in order to produce a composite picture containing characteristic indications of said moving phenomena and characteristic indications of said stationary phenomena, said characteristic indications of said moving phenomena being different from said characteristic indications of said stationary phenomena.

21. A device for indicating the position and motion of objects in space, said device comprising a cathode ray tube screen, search means for producing on said cathode ray tube screen indications of the successive positions of objects in space, means providing a single optical path of a single character for producing a succession of photographs of said cathode ray tube screen, each of said photographs being positive, first filter means adapted to pass a first wavelength range of visible radiation, second filter means adapted to pass a second wavelength range of visible radiation, said second wavelength range being different from said first wavelength range, viewing means, means for projecting a substantially complete image of at least one of said photographs through said first filter means onto said viewing means, means for projecting a substantially complete image of at least another of said photographs through said second filter means onto said viewing means and means for registering said images on said viewing means to produce characteristic indications of moving objects and characteristic indications of stationary objects said characteristic indications of moving objects being different from said characteristic indications of stationary objects.

22. For use in conjunction with a device for indicating the position and motion of objects in space, said device comprising a cathode ray tube screen and search means for producing on said cathode ray tube screen indications of the successive positions of objects in space, a photographic device comprising means providing a single optical path of a single character for producing a succession of photographs of said cathode ray tube screen, each of said photographs being positive, first filter means for passing radiation primarily of a first color, second filter means for passing radiation primarily of a second color, a viewing screen, means for projecting a substantially complete image of one of said successive photographs through said first filter means onto said viewing screen, means for projecting a substantially complete image of another of said successive photographs through said second filter means onto said viewing screen, and means for registering said images on said viewing screen in order to produce characteristic indications of the positions of moving objects and characteristic indications of the positions of stationary objects, said characteristic indications of the positions of moving objects being different from said characteristic indications of the positions of stationary objects.

References Cited in the file of this patent

UNITED STATES PATENTS

| | | |
|---|---|---|
| 2,435,718 | Land | Feb. 10, 1948 |
| 2,520,641 | Land | Aug. 29, 1950 |
| 2,530,828 | Leverenz | Nov. 21, 1950 |
| 2,543,181 | Land | Feb. 27, 1951 |
| 2,581,358 | Busignies et al. | Jan. 8, 1952 |
| 2,586,772 | Ashby et al. | Feb. 26, 1952 |

OTHER REFERENCES

Wall: "History of Three Color Photography" 1925, pages 587, 588. (Copy in Division 67.)